United States Patent Office 3,507,820
Patented Apr. 21, 1970

3,507,820
PROCESS FOR PREPARING A POLYESTER COMPOUND FROM EPOXY RESIN MATERIAL OBTAINED FROM 2-METHYLEPICHLOROHYDRIN
Hiroshi Maeda, Chiba, Koichi Hasegawa and Kiyoshi Fukai, Ichihara, Hisashi Sekiguchi and Fumio Hayakawa, Chiba, and Michihisa Takemura, Ichihara, Japan, assignors, by mesne assignments, to Dainippon Ink and Chemicals, Incorporated, Tokyo, Japan, a corporation of Japan
No Drawing. Filed Oct. 13, 1967, Ser. No. 675,045
Claims priority, application Japan, Oct. 13, 1966, 41/66,907; Dec. 1, 1966, 41/78,359; Aug. 23, 1967, 42/53,737
Int. Cl. C08g 17/01, 17/16, 17/18
U.S. Cl. 260—22
3 Claims

ABSTRACT OF THE DISCLOSURE

A process for preparing a polyester compound, characterized by reacting an epoxy resin obtained from 2-methylepichlorohydrin and a divalent phenol with (1) a polyvalent carboxy compound, (2) a polyvalent carboxy compound and a polyhydric alcohol, or (3) a polyvalent carboxy compound, a polyhydric alcohol and a fatty acid.

The present invention relates to a process for preparing a polyester compound from the epoxy resin material obtained from 2-methylepichlorohydrin and a dihydric phenol referred to hereinafter as a divalent phenol.

A polyester compound as herein referred to is a curable compound having in its molecule a plurality of ester bonds produced by reaction of an epoxy group of the epoxy resin and a carboxyl group of a polyvalent carboxy compound.

An epoxy resin heretofore generally used has been obtained from epichlorohydrin and a divalent phenol, all hydroxyl groups in a molecule thereof are secondary hydroxyl groups tending to cause an esterification reaction with carboxyl groups and a terminal epoxy group thereof opens it ring in an esterification reaction, functioning as primary and secondary hydroxyl groups tending to cause an esterification reaction. Accordingly, even when a degree of condensation is the lowest, this epoxy resin is to have 4 hydroxyl groups tending to cause an esterification reaction, therefore, when this epoxy resin is reacted with a divalent carboxy compound at a ratio of one epoxy group to, for instance, above ½ carboxyl group, this epoxy resin is gelated. Because of this, it has been impossible to prepare a polyester compound by the hitherto used epoxy resin.

Accordingly, an object of the present invention is to provide a process for preparing a polyester compound by reacting an epoxy resin with a polyvalent carboxy compound.

Other objects of the present invention will become apparent from the following description:

The present inventors have found that when an epoxy resin obtained from 2-methylepichlorohydrin and a divalent phenol, regardless of a degree of condensation thereof, is reacted with a divalent carboxy compound at a ratio of one epoxy group to one carboxyl group, said epoxy resin is not gelated, functioning as if it were glycol. The reason said epoxy resin is not gelated is considered that all hydroxyl groups of said epoxy resin are tertiary hydroxyl groups unlikely to cause an esterification reaction, and when said epoxy resin opens its ring they become a primary hydroxyl group and a tertiary hydroxyl group and as a whole said epoxy resin is to have at both its ends one primary hydroxyl group each tending to cause an esterification reaction. Accordingly, the aforementioned object of the present invention may be achieved by using such an epoxy resin as a starting material.

An epoxy resin used in the present invention is obtained by reacting 2-methylepichlorohydrin with a divalent phenol in the presence of a basic compound. And it is preferable to react 2-methylepichlorohydrin in an amount of 1–10 mols based on 1 mol of a divalent phenol. A process for preparing this epoxy resin is essentially the same as the conventional process for preparing an epoxy resin using epichlorohydrin and a divalent phenol. Namely, this epoxy resin can be prepared by adding to an aqueous solution of a basic compound the material mixture in the optional presence of an inert gas and reacting the system by gradually raising the temperature, it can also be prepared by adding to an aqueous solution of a basic compound at first a divalent phenol and then 2-methylepichlorohydrin, further, it can be prepared by adding to the material mixture a basic compound while taking care relative to the generation of heat.

As a divalent phenol which is a component of the epoxy resin, 2,2-bis(4-hydroxyphenyl) propane called bisphenol A is preferably employed, however, 2,2-bis(4-hydroxyphenyl)butane, 1,1-bis(4-hydroxyphenyl)ethane, 1,1-bis(4-hydroxyphenyl)cyclohexane, 1,1-bis(4-hydroxyphenyl)cyclopentane, 4,4 - dihydroxybiphenyl, pyrocatechol, resorcinol, hydroquinone, 1,5-dihydroxynaphthalene, 4,4-hexahydro-4,7-methanoinden-5-isobutenediphenyl and a precondensate of formaldehyde with phenols may also be used. Said basic compound is a catalyst used upon reacting a divalent phenol with 2-methylepichlorohydrin and what is most preferable is caustic soda, however, caustic potash, ammonia and amines may also be used.

Taking advantage of the properties of this epoxy resin as a glycol, by reacting this epoxy resin with a polyvalent carboxy compound with optional concurrent use of polyhydric alcohols, a polyester compound may be prepared.

One of the polyester compounds is obtained by reacting the epoxy resin with a polyvalent carboxy compound and depending upon the kind and the amount of the polyvalent carboxy compound employed, different polyester compounds are prepared.

When a polyvalent carboxy compound such as, a divalent carboxy compound is reacted in an amount within the range of ½–1 mol based on 1 mol of an epoxy compound with the epoxy compound, a high molecular weight epoxy resin having epoxy groups at both its ends is obtained, whose molecular weight increases as ratio of the divalent carboxy compound to the material epoxy resin increases. A reaction temperature, in the range of 140°–260° C. is suitable and especially preferably is a temperature not exceeding 200° C. In an esterification reaction of an epoxy group with a carboxyl group, a catalyst is not necessarily required, however, organic amines, tetrabutyl titanate, dibutyl tin oxide and boron trifluoride may be used as a catalyst. As a divalent carboxy compound which may be used, there are a nonpolymerizable carboxy compound such as, for instance, phthalic anhydride, isophthalic acid, terephthalic acid, tetrahydrophthalic anhydride, endomethylene-tetra hydrophthalic anhydride, succinic acid, adipic acid, dimromosuccinic acid, hexachlorophthalic acid and tetrabromophthalic acid, and a polymerizable carboxy compound such as maleic anhydride, maleic acid, fumaric acid and itaconic acid.

A high molecular weight epoxy resin so obtained dissolves well in an organic solvent as compared with a high molecular weight epoxy resin obtained from epichlorohydrin and its compatibility with other resins is excellent, therefore, it has a broad range of utility. For instance, such an epoxy resin which is liquid at room temperature can be added with an ordinary epoxy resin curing agent such as polyamine, polyamide and an acid anhydride and employed as shaped article, laminate or adhesive, while such an epoxy resin which is solid at room temperature is dissolved in a solvent and blended with a polyamide resin, an alkyd resin, a melamine resin, a urea, a phenol resin, an acryl resin and a polyvinyl butyral resin and the blends may be used as paint and printing ink. Also, a high molecular weight resin of the present invention obtained by using a halogenated carboxy compound having highly inflammable properties may be utilized for still another purpose. Furthermore, when a polyvalent carboxy compound, such as a divalent polymerizable carboxy compound is reacted with the epoxy resin at a ratio of ½–1 mol to 1 mol of the epoxy resin, an unsaturated polyester resin of a structure containing therein the epoxy resin is obtained. It is possible to substitute a part of a polymerizable carboxy compound and a non-polymerizable carboxy compound and use the resultant partially substituted polymerizable carboxy compound. It is appropriate to carry out the reaction in the presence of an inert gas at a temperature within the range of 80–260° C., and preferably 100–200° C. The resultant polyester compound is, the same as an ordinary unsaturated polyester, resin, dissolved in a polymerizable monomer such as styrene, vinyl toluene, acrylic acid ester and methacrylic acid ester, the resultant products may be used as shaped articles, laminates or paints. A cured product is especially excellent in chemical resistance, mechanical properties and adhesiveness.

Further, when the epoxy resin is reacted with divalent and trivalent non-polymerizable carboxy compounds such as a polyvalent carboxy compound at a ratio of one epoxy group to ½–1 carboxyl group, an alkyd resin of a structure containing therein the epoxy resin is obtained. As the reaction method, entire amounts of the epoxy resin and the carboxy compounds may be reacted from the beginning, and the carboxy compounds may be gradually added to the epoxy resin to react therewith. As the reaction temperature, a range of 100–260° C., especially preferably 100–200° C. is suitable. As a non-polymerizable carboxy compound whose valence is at least three, there are, for instance, trimellitic anhydride, pyromellitic anhydride, tricarballylic acid and 2,2,6,6-tetrakis($\beta$-carboxyethyl)cyclohexanone.

The obtained alkyd resin is water-solubilized by actions of amines such as ethyl amine, diethyl amine, triethyl amine, diethanol amine, blended with water-soluble melamine resin and urea resin and the blends may be used as water-soluble paints. A cured blend is excellent in adhesiveness and chemical resistance.

A polyester compound is also obtainable by reacting the epoxy resin with a polyvalent carboxy compound and a polyhydric alcohol. In this case also, depending upon kind of the polyvalent carboxy compound and the polyhydric alcohol, different polyester compounds are prepared.

When the epoxy resin is reacted with a polymerizable divalent carboxy compound such as a polyvalent carboxy compound and a dihydric alcohol such as a polyhydric alcohol at a ratio of one carboxyl group to 1–2 esterifying hydroxyl groups (including a ring opening hydroxyl group of the epoxy group), an unsaturated polyester resin of a structure containing therein the epoxy resin is obtained. In this case, it is preferable that the amount of the epoxy resin exceeds 50 mol percent of the entire alcohol component. It is also possible to substitute a part of the polymerizable carboxy compound for a non-polymerizable divalent carboxy compound. The reaction method is same as the method for the unsaturated polyester resin and the use of the product is also the same. Examples of a dihydric alcohol, include ethylene glycol, propylene glycol, butylene glycol, diethylene glycol and neopentyl glycol.

On the other hand, when the epoxy resin is reacted with a non-polymerizable carboxy compound such as a polyvalent carboxy compound and a polyhydric alcohol such as a trihydric alcohol or at least a dihydric alcohol at a ratio of one carboxyl group to 1–2 esterifying hydroxyl groups (including a ring opening hydroxyl group of the epoxy group), an alkyd resin of a structure containing therein the epoxy resin is obtained. In this case, it is preferable to use the epoxy resin in an amount of 10–50% by weight of the alkyd resin. When trivalent and at least divalent carboxy compounds are used as a polyvalent carboxy compound, a water-soluble alkyd resin same as mentioned above may be prepared. When a divalent carboxy compound is used as a polyvalent carboxy compound, an alkyd resin usable after dissolving in an organic solvent is obtained. The reaction method is the same as that of said alkyd resin. As trihydric alcohol which may be used, there are, for instance, glycerol, trimethylolpropane, trimethylolethane and pentaerythritol.

The obtained alkyd resin has excellent compatibility with other resins, and it may be blended with an oil-modifiable alkyd resin, a melamine resin, a urea resin and an acryl resin and the blends may be used as paints, adhesives and impregnating agents.

It is also possible to obtain a polyester compound by reacting the epoxy resin with a polyvalent carboxy compound, a polyhydric alcohol and a fatty acid.

In this case, the reaction is carried out at a ratio of one carboxyl group to 1–2 esterifying hydroxyl groups (including a ring opening hydroxyl group of the epoxy group). Depending upon kind of the polyvalent carboxy compound, different polyester compounds are prepared.

When non-polymerizable divalent and trivalent carboxy compounds are used as the polyvalent carboxy compound, a water-soluble alkyd resin the same as that which is mentioned above is obtained. On the other hand, when a non-polymerizable divalent carboxy compound is used as the polyvalent carboxy compound, an alkyd resin dissolved in and usable in an organic solvent is obtained. The reaction method is same as the method of said alkyd resin, however, when a fatty acid which has an unsaturated bond is used, it is preferable to carry out the reaction in the presence of an inert gas. As the fatty acid, a fatty acid of a vegetable oil such as coconut oil, soybean oil, linseed oil, castor oil, dehydrated castor oil and tung oil or a fatty acid of an animal oil such as cuttlefish oil and fish oil may be used. The obtained alkyd resin is excellent in its compatibility with other resins, and therefore it may be used after blending with a melamine resin, a urea resin and an acryl resin. An alkyd resin obtained by using an unsaturated fatty acid may be added with a dried such as metal soap and used as an air-curable alkyd resin.

Next, the present invention will be concretely explained with reference to examples, however, prior to the description of the examples, processes for producing epoxy resins I–VI used as the starting materials in each example will be explained.

EPOXY RESIN I

A reactor equipped with a stirrer, a thermometer, a cooler and a funnel for dropping was charged with 228 g. of bisphenol A, 1065 g. of 2-methylepichlorohydrin and 5 ml. of water, to which 82 g. of caustic soda was added little by little while the temperature was adjusted not to exceed 100° C. Next, under a pressure of 50 mm. Hg the reaction system was heated to a temperature below 150° C., the residue was dissolved in benzene and filtered, thereafter benzene was distilled off. The resulting resin had an epoxy equivalent of 210, a color number of 1–2 (Gardner Holdt process, and so forth) and a viscosity of $Z_6$–$Z_7$ (Gardner Holdt process and so forth).

EPOXY RESIN II

To 242 g. of 2,2-bis(4-hydroxyphenyl) butane, 173 g. of 2-methylepichlorohydrin and 200 ml. of water, 78.5 g. of caustic soda were added while the temperature was adjusted not to exceed 100° C., and the reaction system was kept at that temperature for 1 hour. Thereafter, 300 g. of methylisobutylketone and 350 ml. of water were added to the reaction system, and after refluxing the entirety was left to stand to separate an oil layer, which layer was heated under a reduced pressure, the residue was dissolved in 250 g. of methylisobutylketone and after filtering, the solvent was distilled off. The resulting resin was a solid having an epoxy equivalent of 534, a color number of 1–2 (a 40% butyl carbitol solution and so forth) and a viscosity of E–F (same as above) and a softening point of 70° C.

EPOXY RESIN III 420 g. of said epoxy resin I, 137 g. of bisphenol A and 0.5 g. of N,N-dimethylbenzyl amine were heated at 180–200° C. for 8–10 hours, and a solid resin having an epoxy equivalent of 525, a color number of 3–5, a viscosity of D–E and a softening point of 67° C. was obtained.

EPOXY RESIN IV 420 g. of said epoxy resin I, 176 g. of bisphenol A and 0.6 g. of N,N-dimethylbenzylamine were heated at 200–220° C. for 8–10 hours, and a solid resin having an epoxy equivalent of 1045, a color number of 3–4, a viscosity of R and a softening point of 97° C. was obtained.

EPOXY RESIN V

A reactor equipped with a stirrer, a thermometer, a cooler, a funnel for dropping and a siphon was charged with an aqueous solution containing 73 g. of bisphenol A and 25 g. of caustic soda and while heating the reactor at 95° C. 101.3 g. of 2-methylepichlorohydrin was added thereto little by little. After completion of the reaction, the separated water was removed by the siphon and the residue was washed with warm water until litmus paper showed neutrality, thereafter, heated and dried. A solid resin having an epoxy equivalent of 340, a color number of 2–3 and a softening point of 40.5° C., was obtained.

EPOXY RESIN VI

In a nitrogen gas stream 110 g. of white hydroquinone and 149 g. of 2-methylepichlorohydrin were heated at 60–65° C., 400 ml. of methanol containing 114 g. of sodium methylate was added thereto little by little. After completion of the reaction, the reaction mixture was cooled to 0° C., a white solid resin obtained by absorption filtering was washed with water and dried. This resin had an epoxy equivalent of 150 and a softening point of 100–120° C.

Example 1

In an inert gas stream, 210 g. of epoxy resin I, 16.6 g. of isophthalic acid and 0.3 g. of N,N-dimethylbenzylamine were heated at 140–150° C. until the acid value became below 1, and a wheat-gluten-like resin having an epoxy equivalent of 270, a color number of 2–3 and a viscosity of below A was obtained. To 100 parts of said resin, 65 parts of hexahydrophthalic anhydride and 0.5 part of N,N-dimethylbenzylamine were added and mixed at 120–130° C., the mixture was heated at 80° C. for 4 hours and subsequently heated at 170° C. for 3–4 hours, thereby a cured matter having excellence in electric properties and chemical resistance was obtained.

To 100 parts of said wheat-gluten-like resin, 5 parts of piperidine was added and mixed at 40–50° C., the mixture was heated at 80° C. for 8 hours and subsequently heated at 170° C. for 2–3 hours, thereby a cured matter having excellent adhesive strength and mechanical strength was obtained.

Example 2

By heating 210 g. of epoxy resin I, 20 g. of succinic acid and 0.3 g. of triethylene diamine at 150–160° C. until the acid value become below 1, a solid resin having an epoxy equivalent of 520 and a softening point of 63° C. was obtained.

Example 3

By heating 210 g. of epoxy resin I, 11.9 g. of pyrocatechol and 0.5 g. of triethanolamine at 220–240° C. until the acid value became below 1, a resin having an epoxy equivalent of 1070 and a softening point of 92° C. was obtained.

Example 4

210 g. of epoxy resin I, 11.9 g. of pyrocatechol and 0.5 g. of triethnoalamine was heated at 140–160° C. for 3–4 hours, 33.7 g. of adipic acid was added thereto and the mixture was heated at 180–200° C. for 3–4 hours, and a resin having an epoxy equivalent of 1050 and a softening point of 95° C. was obtained.

Example 5

When 534 g. of epoxy resin II, 33 g. of isophthalic acid and 0.5 g. of tetrabutyl titanate were heated at 220–240° C. until the acid value became below 1, a resin having an epoxy equivalent of 1075 and a softening point of 97° C. was obtained.

Example 6

When 525 g. of epoxy resin III, 40.5 g. of sebacic acid and 0.5 g. of N,N-dimethylbenzylamine were heated at 220–240° C. until the acid value became below 1, a resin having an epoxy of 1065 and a softening point of 85° C. was obtained.

Example 7

When 1045 g. of epoxy resin IV, 32 g. of isophthalic acid, 32 g. of maleic anhydride and 0.5 g. of N,N-dimethylbenzylamine were heated at 240–260° C. until the acid value became below 1, a resin having an epoxy equivalent of 2070 and a softening point of 116° C. was obtained.

When with each of said epoxy resins I–IV, a mixture at a predetermined ratio of a divalent carboxy compound with a dihydric alcohol and their acidic condensates were reacted, a proper high molecular weight epoxy resin same as the foregoing examples could be obtained The epoxy resins obtained in the foregoing example were compared with commercially available epoxy resins A–D consisting of epichlorohydrin and bisphenol in respect of solubility and compatibility in Table 1 and Table 2. Epoxy resin A had an epoxy equivalent of 230–280, epoxy resin B had an epoxy equivalent of 425–550, epoxy resin C had an epoxy resin equivalent of 875–1025 and epoxy resin D had an epoxy equivalent of 2000–2500. Swazol 310, Solvesso 150 and HAWS are trade names of solvents of the hydrocarbon series.

|  | Epoxy resin of examples | | | | Commercially available epoxy resin | | | |
|---|---|---|---|---|---|---|---|---|
| Solubility test solvent | 1 | 2 | 3, 4, 5 and 6 | 7 | A | B | C | D |
| Methylisobutylketone | S. | S. | S. | S. | S. | S. | S. | S. |
| Ethyl acetate ester | S. | S. | S. | S. | S. | S. | S. | S. |
| Butyl Cellosolve | S. | S. | S. | S. | S. | S. | S. | S. |
| Butyl Carbitol | S. | S. | S. | S. | S. | S. | S. | S. |
| Benzene | S. | S. | S. | S. | S. | I.S. | I.S. | I.S. |
| Toluene | S. | S. | S. | S. | P.S. | I.S. | I.S. | I.S. |
| Xylene | S. | S. | S. | S. | P.S. | I.S. | I.S. | I.S. |
| n-Butanol | S. | S. | P.S. | I.S. | I.S. | I.S. | I.S. | I.S. |
| i-Butanol | P.S. | I.S. | I.S. | I.S. | I.S. | I.S. | I.S. | I.S. |
| Swazol 310 | S. | S. | P.S. | I.S. | I.S. | I.S. | I.S. | I.S. |
| Solvesso 150 | S. | S. | P.S. | I.S. | I.S. | I.S. | I.S. | I.S. |
| HAWS | S. | P.S. | I.S. | I.S. | I.S. | I.S. | I.S. | I.S. |

S.=soluble.  P.S.=partially soluble.  I.S.=insoluble.

TABLE 2

|  | Epoxy resin of examples | | | | Commercially available epoxy resin | | | |
|---|---|---|---|---|---|---|---|---|
| Compatibility test resin | 1 | 2 | 3, 4, 5 and 6 | 7 | A | B | C | D |
| Alkyd resin: | | | | | | | | |
|   Short oil (soy bean) | C. | C. | C. | S.C. | S.C. | I. | I. | I. |
|   Medium oil (soy bean) | S.C. | S.C. | I. | I. | I. | I. | I. | I. |
|   Non-drying oil modified | C. | C. | C. | C. | C. | C. | C. | C. |
| Phenol resin: | | | | | | | | |
|   Non-modified | C. | C. | C. | C. | C. | C. | C. | C. |
|   Rosin modified | C. | C. | S.C. | S.C. | I. | I. | I. | I. |
| Cellulose derivative: | | | | | | | | |
|   Cellulose acetate | C. | C. | I. | I. | I. | I. | I. | I. |
|   Nitrocellulose | C. | C. | I. | I. | I. | I. | I. | I. |
| Amino resin: | | | | | | | | |
|   Melamine resin | C. | C. | C. | C. | I. | I. | I. | I. |
|   Urea resin | C. | C. | C. | C. | I. | I. | I. | I. |
| Vinyl resin: | | | | | | | | |
|   Vinyl acetate resin | C. | C. | C. | I. | C. | C. | C. |  |
|   Vinyl formal resin | C. | C. | C. | C. | C. | C. | C. | C. |
| Boiled oil | S.C. | S.C. | I. | I. | I. | I. | I. | I. |
| Ester gum | S.C. | S.C. | I. | I. | I. | I. | I. | I. |
| Cumarone resin | S.C. | S.C. | I. | I. | I. | I. | I. | I. |

C.=compatible (forming a transparent film).
S.C.=slightly compatible (forming a somewhat opaque film).
I.=incompatible (forming an opaque film).

Example 8

In an inert gas, 280 g. of soybean fatty acid, 92.4 g. of phthalic anhydride and 48.3 g. of pentaerythritol were heated to 180° C., when the acid value became 140, 311.5 g. of epoxy resin I was added thereto, and the mixture was heated until the acid value became 15.

A solution obtained by diluting the product until the resin component became 50% had a viscosity of $Z_4$–$Z_5$, a color number of 7–8 and excellent compatibility with a butylated melamine resin, short oil and middle oil alkyd resins and nitrocellulose.

Example 9

In an inert gas stream, 88.8 g. of phthalic anhydride, 58.4 g. of adipic acid and 38.0 g. of propylene glycol were heated at 175° C. for 3 hours, thereafter 408 g. of epoxy resin V was added thereto and the mixture was heated until the acid value became 20.

A solution obtained by diluting the product with a 1:1 mixture of butyl cellosolve and xylol until the fat component became 40% had a viscosity of P–Q, a color number of 2–3, and excellent compatibility with a butylated methylol melamine resin, a short oil alkyd resin, nitrocellulose and a thermosetting acryl resin.

Example 10

In a reactor equipped with a decanter in an inert gas stream 200 g. of linseed oil fatty acid, 56.4 g. of phthalic anhydride, 20.2 g. of pentaerythritol and 20 g. of xylol were heated at 165° C. for 4 hours, thereafter 133.6 g. of epoxy resin VI was added thereto, and the mixture was heated at 175° C. until the acid value became 12. A solution obtained by diluting the product with a mixed (3:1) solvent of xylol and Swasol 310 until the resin component became 50% had a viscosity of T–U, a color number of 4–5 and excellent compatibility with other resins.

Example 11

In an inert gas stream 144 g. of tall oil fatty acid, 64 g. of phthalic anhydride, 40 g. of trimellitic anhydride, 43 g. of pentaerythritol and 140 g. of epoxy resin I were heated at 180° C. until the acid value became 60. A solution obtained by diluting the product with a mixed solvent of tertiary butanol, diethanolamine and water until the resin component became 50% had a pH of 9.5, a viscosity of T–U and a color member of 3–4.

Example 12

In an inert gas stream, 340 g. of epoxy resin V and 224 g. of a dimer fatty acid were heated at 180° C. until the acid value became 5, thereafter 77.3 g. of 2,2,6,6-tetrakis (β-carboxyethyl) cyclohexanone was added thereto, and the mixture was further heated for 1.5 hours.

A solution obtained by diluting the product with a mixed solvent of butyl cellosolve, dimethylmonoethanolamine and water until the fat components became 50% had a pH of 8.3, a viscosity of O–P and a color number of 6–7.

With reference to films produced from various compositions obtained by blending with a melamine resin the epoxy modified alkld resins obtained in the foregoing Examples 8–12 and various known alkyd resins, their properties were compared. The experiments were classified into four groups of A, B, C and D in accordance with the blends, blending ratios and curing conditions. The blend and blending ratio (weight ratio of the solid component) of each of the groups were shown in Table 3. The curing conditions were at 120° C. for 30 minutes in Group A, at 150° C. for 30 minutes in Group B, at room temperature in Group C and at 150° C. for 30 minutes in Group D.

TABLE 3

| Group | A | B | C | D |
|---|---|---|---|---|
| Alkyd resin | 42 | 48 | 60 | 80 |
| Butylated melamine resin | 18 | 12 | | |
| Methylated melamine resin | | | | 15 |
| Rutile titanium oxide | 40 | 40 | 40 | |
| Carbon black | | | | 5 |

The results were shown in Tables 4–6. In the tables, resin $a$ is a soybean oil modified alkyd resin, resin $b$ is an oil free alkyd resin, resin $c$ is a linseed oil modified alkyd resin, and resin $d$ is a water-soluble alkyd resin. In each table, all physical properties other than these marked with * were measured 3 days after films were produced.

TABLE 4

| | Group A | | Group B | |
|---|---|---|---|---|
| Alkyd resin used | Resin of Example 8 | Resin $a$ | Resin of Example 9 | Resin $b$ |
| Luster | 94 | 93 | 93 | 90 |
| Sword hardness | 56 | 48 | 68 | 62 |
| Adhesiveness | ++ | + | ++ | +− |
| Impact strength (500 g.), mm | >50 | 30 | >50 | 10 |
| Bending resistance (φ 2 mm.) | ++ | ++ | ++ | ++ |
| Erichsen test, mm | 6.8 | 5.4 | 5.3 | 4.5 |
| Water resistance (120 hrs.) | ++ | ++ | ++ | + |
| Boiling water resistance (20 hrs.) | ++ | − | + | +− |
| Salt water resistance (sprayed for 150 hrs.) | +− | −− | +− | − |
| Caustic soda resistance (5, 72 hrs.) | ++ | +− | ++ | + |
| Hydrochloric acid resistance (5, 72 hrs.) | ++ | − | ++ | +− |
| Gasoline resistance (72 hrs.) | + | − | ++ | +− |
| Lipstick stain resistance (72 hrs.) | + | − | ++ | +− |

TABLE 5

| | Group C | |
|---|---|---|
| Alkyd resin used | Resin of Example 10 | Resin $c$ |
| Time the film was dried was noticed by finger touch*, min | 27 | 50 |
| Time for curing and drying* | (1) | (2) |
| Sword hardness | 42 | 28 |
| Water resistance (72 hrs.) | ++ | +− |
| Boiling water resistance (10 hrs.) | + | − |
| Soap water resistance (72 hrs.) | + | − |
| Moisture resistance (100 hrs.) | + | − |
| Turpentine oil resistance (48 hrs.) | +− | −− |
| Weatherability | + | +− |

[1] 3 hours and 15 minutes.
[2] 6 hours.

TABLE 6

| | Group D | | |
|---|---|---|---|
| Alkyd resin used | Resin of Example 10 | Resin of Example 12 | Resin $d$ |
| Luster | 92 | 84 | 87 |
| Sword hardness | 66 | 56 | 58 |
| Adhesiveness | ++ | ++ | + |
| Impact strength (300 g.) cm | >50 | >50 | 20 |
| Bending resistance (φ 2 mm.) | ++ | ++ | + |
| Erichsen test, (2 mm.) | 5.6 | 6.5 | 4.9 |
| Water resistance (120 hrs.) | ++ | ++ | ++ |
| Boiling water resistance (70 hrs.) | + | + | − |
| Salt water resistance (sprayed for 120 hrs.) | + | + | − |
| Gasoline resistance | ++ | +− | +− |

Example 13

In an inert gas stream, 210 g. of epoxy resin I and 104.4 g. of fumaric acid were heated at 170–175° C. for 3 hours, thereafter 210 g. of epoxy resin I was further added thereto and the mixture was continuously heated until the acid value became 10. To the obtained light yellow solid having a softening point of 98° C., 100 p.p.m. of tertiary butyl catechol and styrene in an amount of 30% by weight (based on the sum of the resin and styrene, and so forth) were added and well mixed.

The obtained resin solution was a light yellow transparent viscous solution having a color number of 6 and a viscosity of $Z_3$, to which 0.6% by weight of cobalt naphthenate, 1% by weight of styrene and 1% by weight of methylethylketone peroxide were added, and when the mixture was heated at 70° C. for 1 hour, a light yellow transparent cured product having little contraction by curing and excellent electric properties, chemical resistance and adhesiveness was obtained.

Example 14

In an inert gas stream, 152 g. of propylene glycol, 192 g. of phthalic anhydride, 88.3 g. of maleic anhydride, 46.4 g. of fumaric acid and 0.1 g. of tertiary butyl catechol were heated at 175° C. for 2 hours and at 205° C. for 5 hours, thereafter 475 g. of epoxy resin V was added thereto, and the mixture was heated until the acid value became 30. With the obtained light yellow solid having a softening point of 52° C., styrene (containing 30 p.p.m. of tertiary butyl catechol) in a weight same as that of the resin component was blended.

The obtained resin solution had a color number of 3–4 and a viscosity of U–V. When to this solution, 0.5% of benzoyl peroxide was added and when the mixture was heated at 60–70° C. for 1 hour, a cured product excellent in hardness, electric properties and chemical resistance was obtained.

Example 15

In an inert gas stream, 22.8 g. of propylene glycol and 58.8 g. of maleic anhydride were heated at 140–150° C., thereafter, 420 g. of epoxy resin I was added thereto and the mixture was heated at 175° C. until the acid value became 20. With the obtained solid having a softening point of 58° C., 100 p.p.m. of tertiary butyl catechol and 60% by weight of methyl methacrylate (containing 50 p.p.m. of hydroquinone monoethyl ether) were blended.

The obtained resin solution had a color number of 2–3 and a viscosity of S–T, to which solution 1% by weight of benzoyl peroxide was added and when the mixed solution was heated at 100° C., a cured product excellent in transparency, mechanical strengths and weatherability was obtained.

Example 16

In an inert gas stream, 78 g. of itaconic acid, 58.4 g. of adipic acid and 140.8 g. of dipropylene glycol were heated at 180° C. until the acid value became 28, thereafter, 30 g. of epoxy resin V was added thereto and the mixture was heated at 150° C. for 1.5 hours. With the obtained solid having a softening point of 78° C., 40% by weight a 7:3 mixture of styrene with vinyl toluene was blended. A solution obtained by adding to the blend 1% by weight of a 0.6% cobalt naphthenate solution and 1% by weight of methylethylketone was curable at room temperature and a cured product excellent in adhesiveness and chemical resistance was produced.

Example 17

In an inert gas stream, 74 g. of phthalic anhydride, 49 g. of maleic anhydride and 53.2 g. of propylene glycol were heated at 170° C. for 4 hours, thereafter 120 g. of epoxy resin VI was added thereto, and the mixture was heated for further 4 hours. To the obtained solid having a softening point of 70° C., 100 p.p.m. of tertiary butyl catechol and 50% by weight of a styrene monomer was added. The resultant resin solution had a color number of 4–5 and a viscosity of T–U. When to the resultant solution 1% by weight of ditertiary butyl peroxide was added and the mixed solution was cured at 100° C., a cured product having high hardness and chemical resistance was produced.

Example 18

In an inert gas stream, 23.2 g. of fumaric acid, 87.5 g. of adipic acid and 680 g. of epoxy resin V were heated at 175° C. for 6 hours, thereafter 34.4 g. of monobutyl maleate was added thereto, and the mixture was heated further for 3 hours. With the obtained solid having a softening point of 85° C., 100 p.p.m. of tertiary butyl catechol and 40% by weight of styrene were blended. The resultant resin solution had a color number of 5–6 and a viscosity of $Z-Z_1$. When to this resultant solution, 1% by weight of benzoyl peroxide was added and the mixed solution was cured at 120° C., a cured product excellent in adhesiveness and flexibility was produced.

The physical properties of the modified unsaturated polyester obtained in the foregoing Examples 13–18 were as shown in Table 7. Each physical property was measured 3 days after films were produced.

benzylamine were added, the mixture was heated at 180–200° C. in an inert gas stream until the acid value became below 1 to obtain a hardly inflammable epoxy resin having epoxy equivalent of 1250, a softening point of 110° C., a color number of 5–6, a viscosity of G–H and a chlorine content of 20%.

What is claimed is:

1. A process for preparing an uncured but curable linear polyester compound, characterized by reacting an epoxy resin obtained from 2-methylepichlorohydrin and a dihydric phenol with a polyvalent carboxy compound.

2. A process for preparing an uncured but curable linear polyester compound, characterized by reacting an epoxy resin obtained from 2-methylepichlorohydrin and a dihydric phenol with a polyvalent carboxy compound and a polyhydric alcohol.

3. A process for preparing an uncured but curable linear polyester compound, characterized by reacting an epoxy resin obtained from 2-methylepichlorohydrin and a dihydric phenol with a polyvalent carboxy compound, a polyhydric alcohol and a fatty acid.

TABLE 7

| Example | 13 | 14 | 15 | 16 | 17 | 18 | Non-modified unsaturated polyester |
|---|---|---|---|---|---|---|---|
| Shrinkage, percent | 5.8 | 5.5 | 5.6 | 5.4 | 5.8 | 6.0 | 8.1 |
| Water absorption ratio after being immersed for 24 hours, percent | 0.06 | 0.08 | 0.06 | 0.10 | 0.09 | 0.07 | 0.25 |
| Parcole hardness | 49 | 48 | 49 | 48 | 52 | 47 | 46 |
| Tensile strength, kg/mm.$^2$ | 9.0 | 8.0 | 9.2 | 6.7 | 7.8 | 8.8 | 4.7 |
| Bending stress, kg/mm.$^2$ | 19.2 | 16.7 | 18.2 | 14.9 | 16.3 | 19.2 | 13.4 |
| Bending modulus of elasticity, kg./mm.$^2$ | 500 | 488 | 500 | 470 | 482 | 490 | 456 |
| Dielectric power factor (IMC) | 0.0118 | 0.0120 | 0.0122 | 0.0140 | 0.0122 | 0.0118 | 0.0148 |
| Volume intrinsic resistance, Ω | $7.00 \times 10^{14}$ | $6.82 \times 10^{14}$ | $6.88 \times 10^{14}$ | $7.10 \times 10^{14}$ | $6.85 \times 10^{14}$ | $6.92 \times 10^{14}$ | $6.76 \times 10^{14}$ |
| Reduced amount by percent after being immersed in 10% caustic soda | 0.42 | 0.44 | 0.42 | 0.59 | 0.55 | 0.50 | 3.5 |
| Reduced amount by percent after being immersed in 10% sulfur | 0.58 | 0.60 | 0.60 | 0.70 | 0.67 | 0.62 | 2.9 |

Example 19

To 210 g. of epoxy resin I, 123 g. of hexachloroendomethylene tetrahydrophthalic acid and 0.5 g. of dimethyl-

References Cited

UNITED STATES PATENTS

| | | | |
|---|---|---|---|
| 3,285,938 | 11/1966 | Sellers | 260—47 |
| 3,340,212 | 9/1967 | Tomita | 260—22 |
| 3,342,895 | 9/1967 | Schmitz-Josten et al. | 260—47 |

OTHER REFERENCES

Chemical Abstracts, vol. 66, No. 18, May 1, 1967, p. 76,547S.

DONALD E. CZAJA, Primary Examiner

R. W. GRIFFIN, Assistant Examiner

U.S. Cl. X.R.

156—332; 260—20, 21, 23, 29.2, 32.6, 32.8, 33.2, 33.4, 33.6, 37, 40, 47, 75, 831, 834, 842, 850